Aug. 12, 1930.  O. L. GILLILAND  1,772,714
TRACK FRAME FOR TRACTORS
Filed Sept. 5, 1925   3 Sheets-Sheet 1
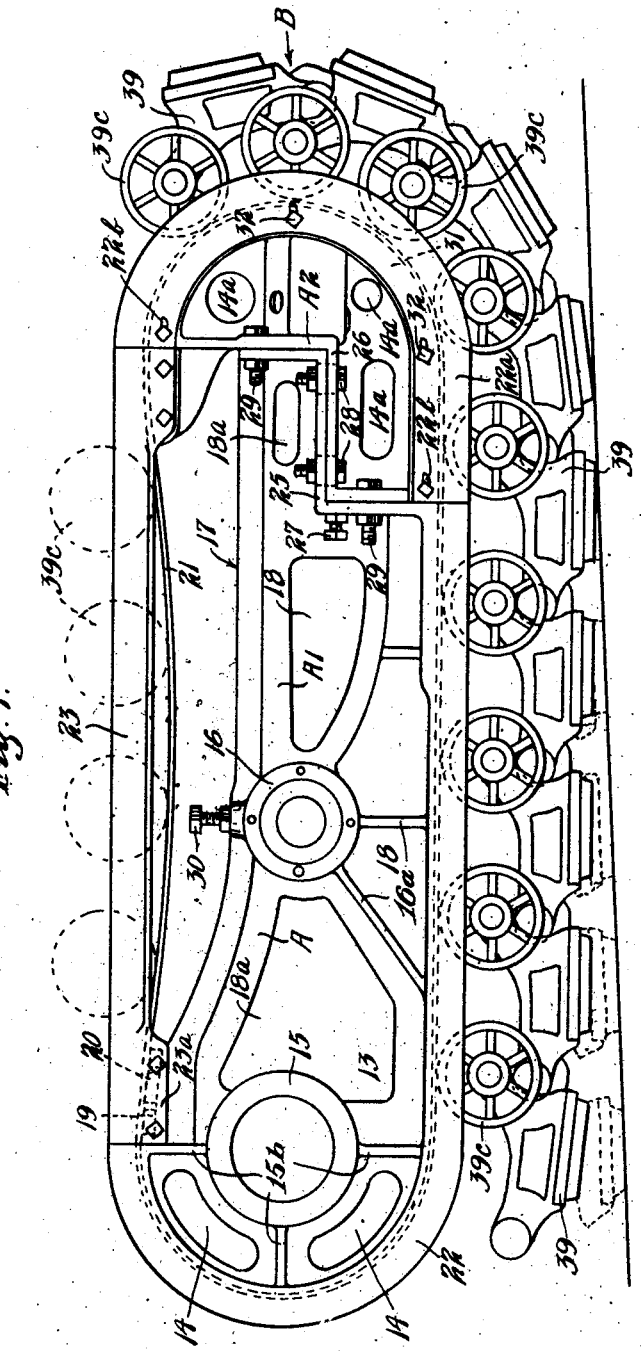
INVENTOR.
ORRA L. GILLILAND.
BY HIS ATTORNEYS.

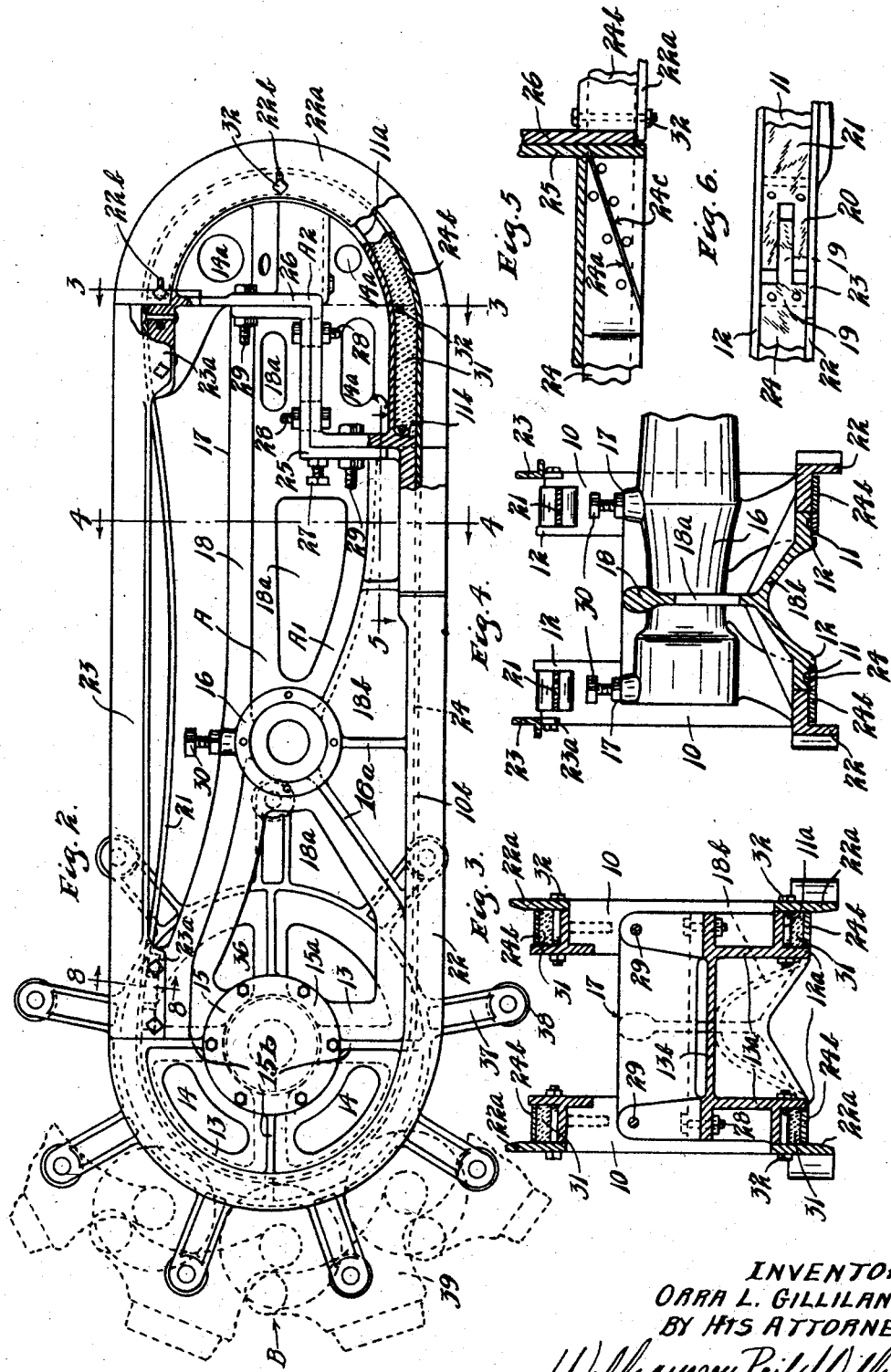

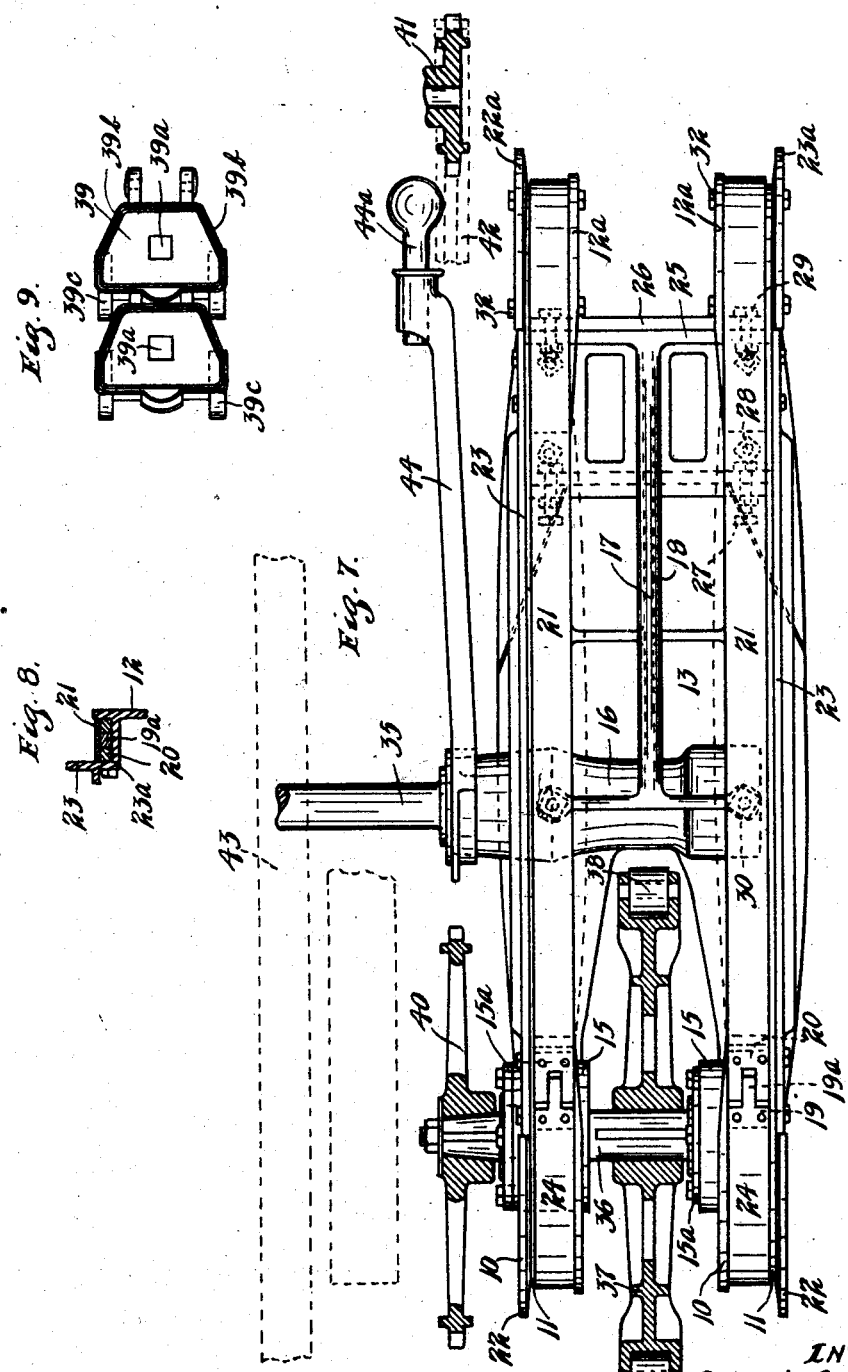

Patented Aug. 12, 1930

1,772,714

UNITED STATES PATENT OFFICE

ORRA L. GILLILAND, OF MINNEAPOLIS, MINNESOTA, ASSIGNOR TO GILLILAND COMPANY, OF MINNEAPOLIS, MINNESOTA, A CORPORATION OF DELAWARE

TRACK FRAME FOR TRACTORS

Application filed September 5, 1925. Serial No. 54,696.

This invention relates to a tractor or truck and particularly to a tread chain frame adapted to be used on such tractor or truck. As is well known, endless tracks for tractors are now widely used for heavy duty. It is desirable in such an endless track structure to have a frame for the track which is pivotally mounted about a transverse pivot so that it may swing in a vertical plane and it is desirable to have this pivot at the rear of the center of the track frame. It is also desirable to have a track frame for the endless tread chain or track having means for taking up the slack in the chain for absorbing the shock as the track sections engage the ground and for giving leeway or resilient movement to compensate for the various stresses and strains in the chain as it travels about the track.

It is the object of this invention to provide a novel and improved track frame for an endless tread chain, incorporating the said desirable features and other features therein.

The objects and advantages of the invention will be more fully set forth in the following description made in connection with the accompanying drawings in which like reference characters refer to the same parts throughout the different views, and in which, Fig. 1 is a view in side elevation of the track frame showing a portion of the endless tread chain in position thereon, indicating some of the tread chain rollers in dotted lines;

Fig. 2 is a view, for the most part, in side elevation of said track frame with other portions shown in vertical section and also showing a driving sprocket for the tread chain, a portion of the tread chain being shown in dotted lines;

Fig. 3 is a vertical section taken on the line 3—3 of Fig. 2, as indicated by the arrows;

Fig. 4 is a vertical section taken on the line 4—4 of Fig. 2, as indicated by the arrows;

Fig. 5 is a horizontal section taken on the line 5—5 of Fig. 2, as indicated by the arrows;

Fig. 6 is a partial top plan view of Fig. 2;

Fig. 7 is, for the most part, a top plan view of the track frame, certain of the parts being shown in vertical section and certain parts of a truck shown in dotted lines;

Fig. 8 is a vertical section taken on the line 8—8 of Fig. 2, as indicated by the arrows; and Fig. 9 is a plan view illustrating a pair of links for a type of tread chain that may be used.

Referring to the drawings, the device comprises a track frame designated generally as A having disposed thereabout an endless tread chain or track designated as B. The track frame A comprises a rear section $A^1$ and a front section $A^2$. The rear section $A^1$ comprises spaced portions 10, each having a flat surface 11, which portions and surface extend horizontally at the bottom of said section to the rear thereof and then in substantially a semi-circular or semi-cylindrical formation to the top thereof. The surfaces 11 have an outwardly extending flange 12 at their inner sides which extends inwardly of said section as the web 13. The web 13 is provided with a plurality of openings 14 of different shapes, as shown in Figs. 1 and 2 and extends to a pair of spaced rear hubs 15 and to an intermediate hub 16, said web being strengthened by ribs $15^b$ extending radially from the hubs 15, and other ribs $16^a$ extend radially from the hub 16. The top of the casing forming the main portion of section $A^1$ is downwardly curved at its top having the top surfaces 17 disposed in longitudinal alinement with the surfaces 11. Said casing also has a heavy central web 18 thickened at its upper edge extending from the hubs 16 to its front end from which transverse ribs extend to the side portions 10, a bottom web $18^b$ extending between side portions 10. The central rib 18 is provided with several openings $18^a$. The top portion of the rear section above the centers of hubs 15 has its surfaces 11 offset downwardly and blocks 19 are bolted thereto each having the forwardly projecting tongue $19^a$. The tongue $19^a$ is embraced in a slot formed centrally of a rearwardly projecting block 20 which is overlapped by and is bolted to the rear end of a comparatively thin resilient plate 21 which is curved inwardly toward surface 17 and is secured at its front end to the upper portion of the section $A^1$ by rivets or bolts, which forward portion of said section and also the forward portion of said plate 21 are substantially in the same horizontal planes as the rear end of section $A^1$ and the rear section of said plate, respectively. The section $A^1$ has an outwardly extending flange 22 at each side extending around its bottom portion outwardly of the track surface 11 and around its circular rear end portion. This flange terminates in a vertical line passing through the center of hubs 15, and side flanges 23 of angle shape, as shown in Fig. 4, are bolted to the sides of said section having downwardly extending lugs $23^a$ at each end for this purpose, which plates 23 form flanges at the top portion of section $A^1$ and aline at their outer surfaces and at their top edges with the flanges 22 at the rear of said section and a similar flange on the front section $A^2$. A track plate 24 of comparatively thin material, preferably steel, abuts the rear end of each plate 21 and extends around the rear of section $A^1$ being superposed on the surface 11 and along the bottom of section $A^1$, said plate 24 terminating in an edge $24^a$ inclined to the longitudinal axis of the frame A shown in Fig. 5. Headed screws 30 extend vertically from bosses on top of hubs 16 beneath the plates 21. The front portion of section $A^1$ terminates in a transverse flange 25 having spaced finished surfaces extending vertically at its bottom then horizontally at its intermediate portion and again vertically at its rear. The forward section $A^2$ has a similar flange 26 at its rear side also having finished surfaces adapted to fit against the surfaces of flange 25. The sections $A^1$ and $A^2$ are adapted for relative longitudinal movement and for this purpose, a headed bolt 27 is threaded into the flange 25 and abuts against the flange 26, said bolt preferably being provided with a jamb nut. Said flanges 25 and 26, at their horizontal portions, are provided with elongated slots through which pass the headed and nutted bolts 28 adapted to hold said sections in their relatively adjusted positions. Said sections are also held in their adjusted positions by the headed and nutted bolts 29, it being possible to insert shims between the vertical surfaces of flanges 25 and 26 when the sections are so adjusted. The forward section $A^2$ comprises the outer flanges $22^a$ alining with the flanges 22 on section $A^1$ and alining at their upper portions with plates 23. Said section also has the inner flanges $12^a$ which extend inwardly as the webs $13^a$, said webs being alined by a cross web $13^b$, the webs $13^a$ forming a plurality of holes $14^a$ therethrough. The forward section $A^2$ has spaced flat surfaces $11^a$ which, at the bottom portion of section $A^1$, aline horizontally with the surfaces 11 but are offset inwardly at $11^a$ and extend in such offset relation to the upper end of section $A^1$. A comparatively thin track plate $24^b$ is disposed on the surface $11^a$ at the bottom of section $A^2$ and at its rear end, this plate $24^b$ has an inclined edge $24^c$ closely adjacent and parallel to the edge $24^a$ of the plate 24, the outer surfaces of plates 24 and $24^b$ adjacent the edges $24^a$ and $24^c$ being flush. The plate $24^b$ extends around the semi-circular front end of section $A^2$ and alines vertically and horizontally at its upper end with the forward end of plate 21. A resilient cushion 31 of rubber or similar material is disposed between the plate $24^b$ and the inwardly offset portion of surface $11^a$, as shown in Fig. 2. It may be here stated that the outer flanges $22^a$ on section $A^2$ are made as separate pieces and bolted to the casting forming the central part of said section, as shown in Fig. 3. Securing bolts 32 extend through the inner flanges $12^a$ and through the resilient cushion 31. The plates or flanges $22^a$ are provided with elongated longitudinally extending slots $22^b$ through which the bolts 32 pass so that after the sections $A^1$ and $A^2$ are separated the plates or flanges $22^a$ may be moved again into engagement with flanges 22 and plates 23. The bottom rear portion or section $A^2$ and the forward rear portion of section $A^1$ at their portions 10, are divided along lines parallel and substantially coinciding with the lines $24^a$ and $24^c$, so that when sections $A^1$ and $A^2$ are relatively moved longitudinally the distance between these inclined edges or surfaces will be increased or decreased. It should be noted that the distance between flanges 22 and $22^a$ at the bottom of sections $A^1$ and $A^2$ is considerably greater than the distance between said flanges and between the flanges 23 at the top of said sections. Said flanges at the top are substantially parallel, but, as shown in Fig. 7, said flanges at the bottom extend outwardly gradually from points below the centers of the semi-circular ends of sections $A^1$ and $A^2$ to a point substantially midway of said centers.

The frame A is supported about a trunnion formed on an axle 35 which is the rear wheel axle of the truck to which the device is applied. A driving shaft 36 is journaled in the hubs 15, which hubs are closed at their ends by the plates $15^a$ bolted thereto, and a driving sprocket 37 is secured to the shaft 36, said sprocket having rearwardly extending arms in the outer ends of which are journaled the rollers 38. The rollers 38 are adapted to engage in central openings $39^a$ in the links 39, which links are pivotally connected to form the tread chain B. Said links have bearing rollers $39^c$ journaled therein which are spaced and adapted to engage the outer sides of the plates 24, $24^b$ and 21, as shown in Fig. 1. Attention is called to the fact that the links 39, particularly the front portions thereof, as shown in Fig. 9, have converging inclined surfaces 39$^b$ at one end. The tread chain B specifically forms no part of the present invention, the same being disclosed and claimed in applicant's co-pending application executed July 13th, 1925, Serial Number 54,696, filed September 5, 1925. The shaft 36 has secured to its inner side a driving sprocket 40 adapted to be driven by a smaller sprocket 41 secured to the driving shaft of the truck or tractor by means of a chain 42. Portions of the truck frame are shown in dotted lines in Fig. 7 as 43 and a radius rod 44 embracing the hub 16 at one end and adapted to be universally connected by the bolt 44$^a$ to the truck frame at its other end is also shown.

In operation, the frame A and its tread chain B are applied to the axle 35 of a truck or tractor, as shown in Fig. 7. While the device can be applied to any suitable truck or tractor, in the embodiment of the invention illustrated, the parts represent the device as applied to the well known Mack truck made by the International Motor Co. The large rear wheels of the truck are removed and the frame A placed on the axle 35 in their place. The sprocket 40 is then in position to be driven by the standard sprocket 41 already on the truck. The sprocket 40 drives shaft 36 which, in turn, revolves the driving sprocket 37 which engages the links of the tread chain B. The weight of the frame A and the greater part of the weight of the truck and load is on the part of chain B in contact with the ground and the re-action of the driven chain moves the frame A and the tractor forwardly in a manner well known for an endless track structure. The tread chain B is placed in connected position on the frame A and the latter can then be adjusted by moving sections A$^1$ and A$^2$ longitudinally to properly tension the chain on the track. As stated, this adjustment is made by the bolts 27 and section A$^2$ is moved away from section A$^1$ the desired amount. In the movement the inclined edges at the bottom part of the section and the inclined edges on the track plate 24 and 24$^b$ move away from each other longitudinally of the frame. The space between these parts may, if desired, be filled by a plate of proper width which will be bolted in position. After the sections are suitably adjusted, the same will then be tightly held in position by the bolts 28 and 29, suitable shim plates being inserted between the vertical portion of flanges 25 and 26. As stated, after the sections A$^1$ and A$^2$ are adjusted, plates or flanges 22$^a$ can be moved rearwardly so as to engage the front edges of the plates 22 and 23, bolts 32 then being tightened. The structure is now in position to be operated and the sections A$^1$ and A$^2$ can be adjusted at intervals to keep the chain properly tensioned after the same has become loose through wear. In practice, the chain is tensioned after about every thousand miles of travel. The top run of the chain rests on the resilient bar or plate 21 and this plate will be flexed more or less by the weight of the chain. The chain can thus sag to a certain degree and keep the slack taken up and at the same time, it is supported. The limit of bending or flexing of plate 21 can be adjusted by adjustment of screws 30, said screws being contacted by plates 21. It will be noted that plates 21 are rigidly fastened at their front ends but are slidably secured at their rear ends so that the blocks 20 will slide back and forth relatively to blocks 19, the same being kept in proper relation by tongues 19$^a$. The links are guided and held in proper lateral position at the ends and top of the track by the plates or flanges 23, 22$^a$ and 22. The truck or vehicle is steered by the front wheels and when the front wheels are turned laterally there is a tendency to swing the track frame laterally. Owing to the fact that the track, that is, the distance between flanges 22 and 22$^a$ at the bottom of the tractor is wider than the distance between the outer edges of wheels 39$^c$, the frame can move somewhat laterally across the links at the bottom which are on the ground. This results in the links which are coming down in contact with the ground being placed on the ground at an angle so that the track is laid down in a curve and the turn can be made. When the device encounters soft earth the rear end of the frame will sink downwardly into the earth, owing to the driving being at the rear end, so that the frame will be in an upwardly inclined position with the tread portions of the links disposed on an upwardly inclined plane, as shown in dotted lines in Fig. 1. When the links thus sink into the ground and the chain is pulled upon by the sprocket 37, there will be a traction force obtained by the inclined sides 39$^b$ of the links which converge rearwardly. The portion of the chain on the ground is, of course, stationary and if the frame sinks sufficiently the wheels 39$^c$ will be brought into the ground and the surfaces will also assist in the tractive force exerted. When the tractor is thus operating in soft earth the track, as stated, is inclined up hill and the tractor continues in motion no matter how deeply the same sinks. With such endless tread tractors there is a jar or shock given to the frame when the links come into contact with the ground. In the present structure this shock is relieved and absorbed by the resilient cushions 31 inserted beneath the track plates 24$^b$.

The track frame and tread chain can also be used for trailer purposes. The engagement of the links with the ground causes the chain to roll around the frame on its roller bearings, thus forming in effect an elongated wheel. The tractor effect will be applied at the axle hub.

From the above description it is seen that applicant has provided a simple and very efficient tractor structure. The frame is supported for very effective movement and the tread chain is moved in an efficient and effective manner, the same being kept properly tensioned and the shock and vibration thereof being substantially eliminated. The structure is particularly adapted for operating on soft ground. The device has been amply demonstrated in severe trials and actual practice and the tractor has been moved through soft ground where operations would ordinarily be considered impossible. The rugged trials given the structure and practice have shown the same to be very substantial and efficient.

It will, of course, be understood, that various changes may be made in the form, details, arrangements and proportions of the parts without departing from the scope of applicant's invention, which, generally stated, consists in a device capable of carrying out the objects above set forth, in the novel parts and combinations of parts disclosed and defined in the appended claims.

What is claimed is:

1. A track frame for an endless tread chain having a track plate extending thereabout with which the bearing members of said tread chain engage, a portion of said track plate at the top of said track frame being concavely curved respective to said frame and resilient.

2. A track frame for an endless tread chain tractor comprising an elongated oblong structure having laterally spaced tracks for said chain, each having a substantially horizontal bottom portion, substantially circular end portions, and a resilient downwardly curved top portion adapted automatically to move under the weight of said chain and take up the slack thereof and means for adjustably limiting the downward movement of said resilient downwardly curved top portion.

3. A track frame for an endless tread chain tractor comprising an elongated oblong structure having laterally spaced tracks for said chain, each having a substantially horizontal bottom portion, substantially circular end portions, a resilient top portion adapted automatically to move under the weight of said chain and take up the slack thereof, and vertical flanges extending outwardly from the sides of said tracks, said tracks being wider at their bottoms than at their tops and said vertical flanges being spaced a greater distance apart at the bottom than at the top of said frame to permit sliding movement of the links of the lower run of the chain laterally without skidding as the frame is steered.

4. A track frame for an endless tread chain, comprising an elongated substantially oblong structure having laterally spaced tracks for said chain extending around the same, flanges at the outer sides of said tracks, said tracks being of greater width at the bottom than at the top of said structure and said flanges being spaced farther apart at the bottom than at the top of the said tracks, whereby lateral movement of the tread chain will be permitted in the lower portion of the track frame to permit the frame to be steered without the lower run of the chain skidding.

5. A device of the class described comprising an oblong frame adapted to form a track for an endless tread chain, said frame having an inwardly and concavely curved top portion, and a track forming plate secured to said frame and spaced from said portion between its ends, said track forming plate being somewhat resilient and comprising a section fixedly secured to said frame at one end and slidably engaging said frame at its other end.

6. A track frame for an endless tread chain, comprising laterally spaced elongated tracks with substantially semi-circular ends, said tracks having longitudinally spaced top portions at their upper sides, and resilient track plates each rigidly secured at one end to one of said top portions of one of said tracks, extending between the spaced ends thereof and resting at its other end on the other top portion of its respective track and being downwardly curved between the top portions.

In testimony whereof I affix my signature.

ORRA L. GILLILAND.